United States Patent
An et al.

(10) Patent No.: US 11,314,559 B2
(45) Date of Patent: Apr. 26, 2022

(54) METHOD FOR BALANCED SCALE OUT OF RESOURCES IN DISTRIBUTED AND COLLABORATIVE CONTAINER PLATFORM ENVIRONMENT

(71) Applicant: Korea Electronics Technology Institute, Seongnam-si (KR)

(72) Inventors: Jae Hoon An, Incheon (KR); Young Hwan Kim, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 17/082,446

(22) Filed: Oct. 28, 2020

(65) Prior Publication Data

US 2021/0149745 A1    May 20, 2021

(30) Foreign Application Priority Data

Nov. 15, 2019 (KR) .................. 10-2019-0146414

(51) Int. Cl.
*G06F 9/50* (2006.01)

(52) U.S. Cl.
CPC ............ *G06F 9/5083* (2013.01); *G06F 9/505* (2013.01); *G06F 9/5077* (2013.01); *G06F 2209/505* (2013.01)

(58) Field of Classification Search
CPC ...... G06F 9/5083; G06F 9/505; G06F 9/5077; G06F 2209/505; G06F 9/5072; G06F 11/2094

See application file for complete search history.

(56) References Cited

U.S. PATENT DOCUMENTS

| | | | |
|---|---|---|---|
| 2019/0340265 A1 | 11/2019 | Raman et al. | |
| 2020/0151018 A1* | 5/2020 | Jha | G06F 9/5077 |
| 2020/0267212 A1* | 8/2020 | Chatt | H04L 47/783 |

FOREIGN PATENT DOCUMENTS

| | | |
|---|---|---|
| KR | 10-2015-0062634 A | 6/2015 |
| KR | 10-1740490 B1 | 5/2017 |

OTHER PUBLICATIONS

Korean Office Action dated Aug. 5, 2020 in counterpart Korean Patent Application No. 10-2019-0146414 (3 pages in English, 5 pages in Korean).

* cited by examiner

*Primary Examiner* — Sisley N Kim
(74) *Attorney, Agent, or Firm* — NSIP Law (57) ABSTRACT

A cloud management method and a cloud management device are provided. The cloud management method determines whether a plurality of pods are overloaded, identifies resource usage current states of a cluster and a node, and determines a method of scaling resources of a specific pod that is overloaded from among the plurality of pods, according to the resource usage current states of the cluster and the node, and scales the resources of the specific pod according to the determined method. Accordingly, scaling for uniformly extending resources of a node and a pod in a cluster horizontally and vertically can be automatically performed.

20 Claims, 5 Drawing Sheets

METHOD FOR BALANCED SCALE OUT OF RESOURCES IN DISTRIBUTED AND COLLABORATIVE CONTAINER PLATFORM ENVIRONMENT

CROSS-REFERENCE TO RELATED APPLICATION(S) AND CLAIM OF PRIORITY

This application is based on and claims priority under 35 U.S.C. § 119 to Korean Patent Application No. 10-2019-0146414, filed on Nov. 15, 2019, in the Korean Intellectual Property Office, the disclosure of which is herein incorporated by reference in its entirety.

BACKGROUND

Field

The present disclosure relates generally to a method and a device for managing a cloud, and more particularly, to a cloud management device and a cloud management method for balanced scaling of resources in a cloud platform environment.

Description of Related Art

The features described in this section only provide background information regarding present embodiments, and do not constitute related-art technology.

The proportion of using a cloud environment rather than establishing an on-premise server environment when applications are developed and services are provided is increasing recently. However, there is no change in constraints of an operating system and a platform in executing various application in the cloud environment, and there still remain the problems of a slow development process and inflexible development and distribution methods of applications.

In addition, container-based micro services, which are capable of effectively using internal resources, and distributing and managing applications promptly on a second basis, have come to the market, but the container-based micro services have a limit to scaling out resources in response to increasing traffic of users.

Such a micro service does not allow mobility of services between container platforms, and has problems that it is difficult to flexibly scale out resources and to maximize mobility of services as collaboration between container platforms which flexibly provide extension and availability of services and are distributed geographically is needed.

In addition, since existing cloud resource scaling-out methods only provide one-dimensional scale out horizontally or vertically, there is a limit to scaling out resources.

Accordingly, there is a demand for a method for balanced scaling out of resources in a large-scale distributed and collaborative environment of a cloud.

SUMMARY

To address the above-discussed deficiencies of the prior art, it is a primary object of the present disclosure to provide a cloud management method and a cloud management device, which determine whether a plurality of pods are overloaded, identify resource usage current states of a cluster and a node, and determine a method of scaling resources of a specific pod that is overloaded from among the plurality of pods, according to the resource usage current states of the cluster and the node, and scale the resources of the specific pod according to the determined method.

The technical objects to be achieved by the present disclosure are not limited to those mentioned in the above, and other technical objects that are not mentioned herein could be clearly understood by a person skilled in the art based on the following descriptions.

According to an embodiment of the present disclosure to achieve the above-described object, a cloud management method by a cloud management device in a cloud platform environment includes: determining whether a plurality of pods are overloaded; identifying resource usage current states of a cluster and a node; and determining a method of scaling resources of a specific pod that is overloaded from among the plurality of pods, according to the resource usage current states of the cluster and the node, and scaling the resources of the specific pod according to the determined method.

In addition, scaling may include, when available resources of a specific node including the specific pod are less than resources allocated to the specific pod, scaling the resources of the specific pod by increasing the resources allocated to the specific pod.

In addition, scaling may include, when the available resources of the specific node including the specific pod are larger than or equal to the resources allocated to the specific pod, scaling the resources of the specific pod by creating a pod replica in the corresponding specific node by replicating the same pod as the specific pod, and by setting the specific pod and the pod replica to perform a same service.

In addition, scaling may include, when the available resources of the specific node including the specific pod are larger than the resources allocated to the specific pod, scaling the resources of the specific pod by creating a pod replica by replicating the same pod as the specific pod, by further increasing the resources allocated to the specific pod and resources allocated to the pod replica, respectively, and by setting the specific pod and the pod replica to perform a same service.

In addition, scaling may include, when the available resources of the specific node including the specific pod are larger than or equal to the resources allocated to the specific pod, and when there exists a node available resources of which are larger than or equal to the resources allocated to the specific pod, from among other nodes in a cluster including the specific pod, scaling the resources of the specific pod by creating a pod replica in the corresponding another node by replicating the same pod as the specific pod, and by setting the specific pod and the pod replica to perform a same service.

In addition, scaling may include, when the available resources of the specific node including the specific pod are larger than or equal to the resources allocated to the specific pod, and when there does not exist a node available resources of which are larger than or equal to the resources allocated to the specific pod, from among other nodes in a cluster including the specific pod, scaling the resources of the specific pod by creating a pod replica in the specific node by replicating the same pod as the specific pod, and by setting the specific pod and the pod replica to perform a same service.

In addition, scaling may include, when the available resources of the specific node including the specific pod are larger than or equal to the resources allocated to the specific pod, and when there exists a node available resources of which are larger than or equal to the resources allocated to the specific pod, from among nodes in another cluster, scaling the resources of the specific pod by creating a pod replica in the node of the corresponding another cluster by replicating the same pod as the specific pod, and by setting the specific pod and the pod replica to perform a same service.

In addition, scaling may include, when available resources of a specific node including the specific pod are less than or equal to a threshold value, scaling the resources of the specific pod by creating a pod replica in another node in a cluster including the specific pod by replicating the same pod as the specific pod, and by setting the specific pod and the pod replica to perform a same service.

In addition, scaling may include, when all available resources of all nodes in the cluster including the specific pod are less than or equal to a specific value, scaling the resources of the specific pod by creating a pod replica in a node of another cluster by replicating the same pod as the specific pod, and by setting the specific pod and the pod replica to perform a same service.

According to an embodiment of the present disclosure, there is provided a computer readable recording medium having a computer program recorded thereon, for performing a cloud management method by a cloud management device in a cloud platform environment, the method including: determining whether a plurality of pods are overloaded; identifying resource usage current states of a cluster and a node; and determining a method of scaling resources of a specific pod that is overloaded from among the plurality of pods, according to the resource usage current states of the cluster and the node, and scaling the resources of the specific pod according to the determined method.

According to an embodiment of the present disclosure, a cloud management device includes: a communication unit configured to receive state information of a plurality of pods and resource usage current state information of a cluster and a node; and a controller configured to determine whether the plurality of pods are overloaded, to identify resource usage current states of the cluster and the node, and to determine a method of scaling resources of a specific pod that is overloaded from among the plurality of pods, according to the resource usage current states of the cluster and the node, and to scale resources of the specific pod according to the determined method.

According to an embodiment of the present disclosure, a cloud system includes: a cloud platform including a plurality of clusters, a plurality of nodes, and a plurality of pods; and a cloud management device configured to determine whether the plurality of pods are overloaded, to identify resource usage current states of the cluster and the node, and to determine a method of scaling resources of a specific pod that is overloaded from among the plurality of pods, according to the resource usage current states of the cluster and the node, and to scale resources of the specific pod according to the determined method.

According to various embodiments of the disclosure, there are provided a cloud management method and a cloud management device, which determine whether a plurality of pods are overloaded, identify resource usage current states of a cluster and a node, and determine a method of scaling resources of a specific pod that is overloaded from among the plurality of pods, according to the resource usage current states of the cluster and the node, and scale the resources of the specific pod according to the determined method. Accordingly, scaling for uniformly extending resources of a node and a pod in a cluster horizontally and vertically can be automatically performed.

The effects that can be achieved by the present disclosure are not limited to those mentioned in the above, and other effects that are not mentioned herein could be clearly understood by a person skilled in the art based on the following descriptions.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The present disclosure will now be described more fully with reference to specific embodiments of the present disclosure illustrated in the accompanying drawings to clarify features and advantages of the present disclosure.

In the following description and the accompanying drawings, well-known functions or constructions are not described in detail since they would obscure the invention in unnecessary detail. In addition, it should be noted that, throughout the drawings, the same reference numerals are used for the same elements if possible.

Terms or words used in the following description and drawings should not be interpreted as being limited to general and dictionary definitions, and should be interpreted as having definitions and concepts suitable for the technical idea of the present disclosure, based on the principle that the inventors can appropriately define the terms as concepts for explaining their invention in the best method.

Accordingly, the constructions illustrated in the embodiments of the detailed description and the drawings are merely the most preferred embodiment of the present disclosure, and do not represent all technical ideas of the present disclosure. Therefore, the embodiments should be construed as including various equivalents and variations substituted therefor at the time of filing of this application.

The terms such as "first" or "second" used in various embodiments may be used to explain various elements and to distinguish one element from another element, but do not limit the elements. For example, without departing from the scope of the present disclosure, a second element may be referred to as a first element, and similarly, a first element may be referred to as a second element.

It will be understood that when an element is referred to as being "coupled to" or "connected to" another element, it can be logically or physically coupled or connected to another element.

In other words, an element may be directly coupled or connected to another element, hut there may be an intervening element therehetween or the element may be indirectly coupled or connected to another element.

The terms "include" or "have" used in the detailed description indicate the presence of features, numbers, steps, operations, elements, components or a combination thereof described in the detailed description, and do not preclude the presence or addition of one or more other features, numbers, steps, operations, elements, components, or a combination thereof.

The terms "unit" and "module" and the terms having suffix "-er" or "-or" used in the detailed description refer to a unit for processing at least one function or operation, and may be implemented by hardware, software, or a combination of hardware and software.

As used herein, the terms "a", "an," "one," "the," and similar terms thereto are intended to include the singular forms and the plural forms, unless the context describing the present disclosure (in particular, the context of claims presented below) clearly indicates otherwise.

Hereinafter, the present disclosure will be described in detail with reference to the accompanying drawings.

Figure 1:
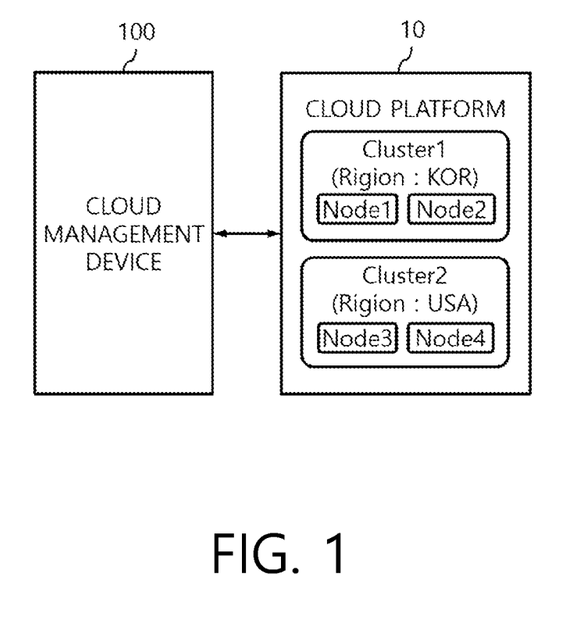
FIG. 1 is a view illustrating a configuration of a cloud system according to an embodiment of the present disclosure.

FIG. 1 is a view illustrating a configuration of a cloud system according to an embodiment of the present disclosure. As shown in FIG. 1, in the cloud system, a cloud platform 10 is managed by a cloud management device 100.

The cloud management device 100 determines whether a plurality of pods are overloaded, identifies resource usage current states of clusters and nodes, determines a method of scaling resources of a specific pod that is overloaded from among the plurality of pods, according to the resource usage current states of the clusters and the nodes, and scales the resources of the specific pod according to the determined method. In addition, the cloud platform 10 scales resources of a pod under control of the cloud management device 100.

Herein, scaling refers to adding resources to enhance performance, and scaling of a pod may apply a method of increasing resources of the pod or a method of adding resources by replicating the pod.

Specifically, the cloud management device 100 may perform vertical scaling (vertical pod auto-scaler (VPA)) by a method of increasing resources of a CPU or a memory of a pod, and may perform horizontal scaling (horizontal pod auto-scaler (HPA)) by creating a pod replica which is the same as the pod. In addition, the cloud management device 100 may scale by hybrid scaling (hybrid pod auto-scaler (hybrid-PA)) which performs the two scaling methods described above, simultaneously.

In addition, the cloud management device 100 may perform load balancing with respect to a service request by reducing the number of service requests for a pod which has a slow service response speed, and by increasing the number of service requests for a pod which has a fast service response speed.

The cloud management device 100 may be implemented by a physically independent device, may be implemented in an integrated form as a part of a certain device, system, or cloud, or may be implemented in the form of software like a program, a platform, a framework, or an application installed in a smartphone, a computer, a server, or a cloud. In addition, respective components of the cloud management device 100 may be implemented by physical components or may be implemented by components in the form of functions of software.

The cloud platform 10 may be a platform that includes a plurality of servers and provides cloud services through virtualization, and may be implemented by Docker and Kubernetes, etc., and may be established as a distributed and collaborative container platform environment.

The cloud platform 10 includes a plurality of clusters, a plurality of nodes, and a plurality of pods.

As shown in FIG. 1, the cloud platform 10 may include the plurality of clusters, and the plurality of nodes are included in one cluster. At least one pod may be included in the node.

Herein, the cluster is a virtualized environment that makes various servers seem like one server, and may be positioned on a regional basis. Specifically, the cloud platform 10 of FIG. 1 includes cluster 1 and cluster 2, and cluster 1 may be positioned in Korea and cluster 2 may be positioned in U.S.A.

In addition, it can be seen that one cluster includes a plurality of nodes. The node refers to a sever unit based on which a real service is executed. The node serves to create a service and to manage a service state, and may include a plurality of pods for performing services.

The cloud platform 10 structed as described above performs a function of allocating resources for executing a specific service to a node that is determined by the cloud management device 100.

In addition, the cloud management device 100 performs a function of a master of managing all clusters. All commands invoke an application programming interface (API) server of the cloud management device 100 which is the master, and a node performs a necessary operation while communicating with the cloud management device 100. When a command is for a container of a specific node or a log is inquired, a command is not directly transmitted to the node, but is transmitted to the cloud management device 100, and the cloud management device 100 accesses the node instead and replies with a result.

Figure 2:
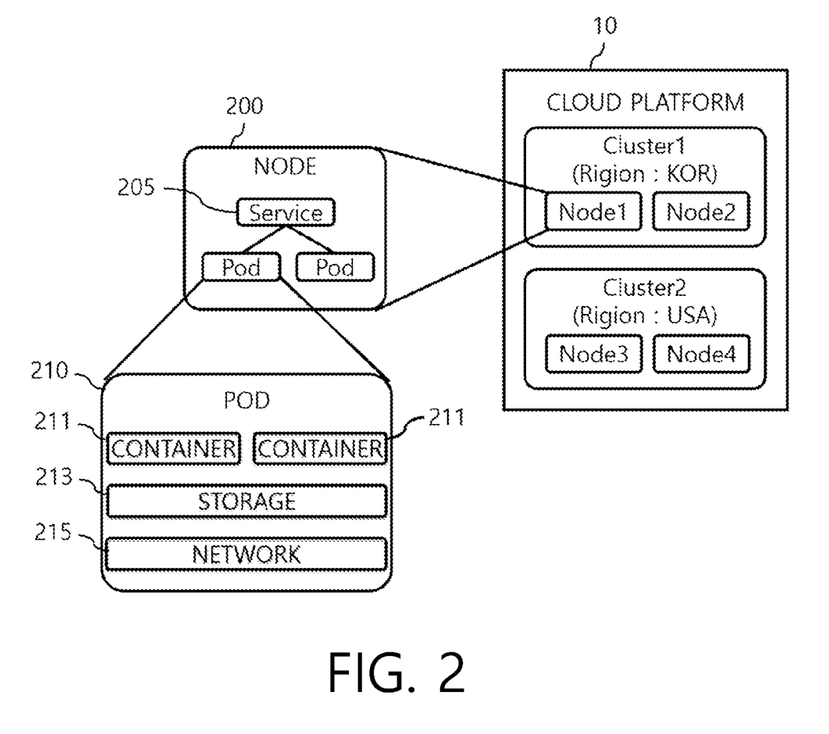
FIG. 2 is a view illustrating a detailed configuration of a cloud platform according to an embodiment of the present disclosure.

The node includes at least one pod to perform a service. A structure of the node will be described in detail below with reference to FIG. 2. FIG. 2 is a view illustrating a detailed configuration of the cloud platform 10 according to an embodiment.

As shown in FIG. 2, the cluster of the cloud platform 10 includes a plurality of nodes 200, and the node 200 includes at least one pod 210 for performing a specific service 205.

The node 200 may create a necessary pod 210 and may set a network 215 and a storage 213 while communicating with the cloud management device 100.

The pod 210 is the smallest distribution unit, and is where real containers are created. The pod 210 is created and managed by a controller or a ReplicaSet, and may be extended to hundreds of pods or thousands of pods. The pods 210 may be labeled to define their respective using purposes (specialized for GPU, SSD server). The pod 210 is the smallest unit that can be distributed in Kubernetes, and has the attributes of one or more containers 211, the storage 213, and the network 215. At least one container 211 belonging to the pod 210 may share the storage 213 and the network 215, and may access a localhost.

The cloud platform 10 includes the plurality of clusters, the plurality of nodes, and the plurality of pods structured as described above.

Figure 3:
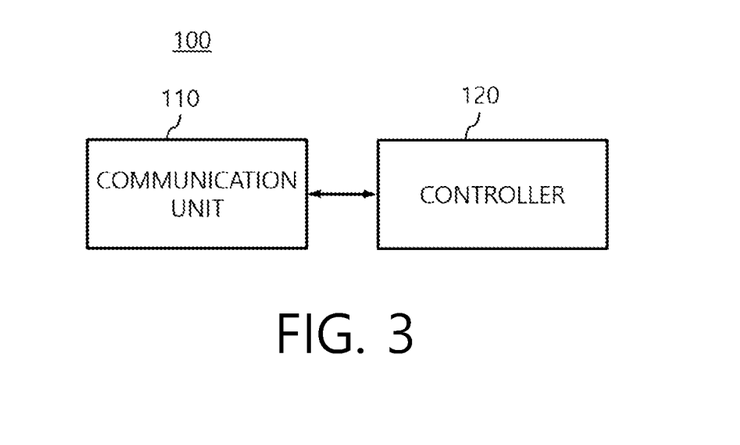
FIG. 3 is a view illustrating a cloud management device according to an embodiment of the present disclosure.

Hereinafter, a configuration of the cloud management device 100 will be described in detail with reference to FIG. 3. FIG. 3 is a view illustrating the cloud management device 100 according to an embodiment.

As shown in FIG. 3, the cloud management device 100 includes a communication unit 110 and a controller 120.

The communication unit 110 is connected to communicate with the cloud platform 10, and receives state information of the plurality of pods and resource usage current state information of the cluster and the node. Herein, the state information of the pod is information for determining whether the pod is overloaded, and may include information on a usage rate of a CPU or a memory of the pod. In addition, the resource usage current state information of the cluster indicates usage current state information and available resource current state information of a CPU, a memory, and a storage in each cluster, and the resource usage current state information of the node indicates usage current state information and available resource current state information of a CPU, a memory, and a storage in each node.

The communication unit 110 may perform communication in various wireless communication methods such as Bluetooth, WiFi, near field communication (NFC), cellular, long-term evolution (LTE), or the like, and may perform communication through wired communication such as a wired local area network (LAN) or the like.

Figure 4:
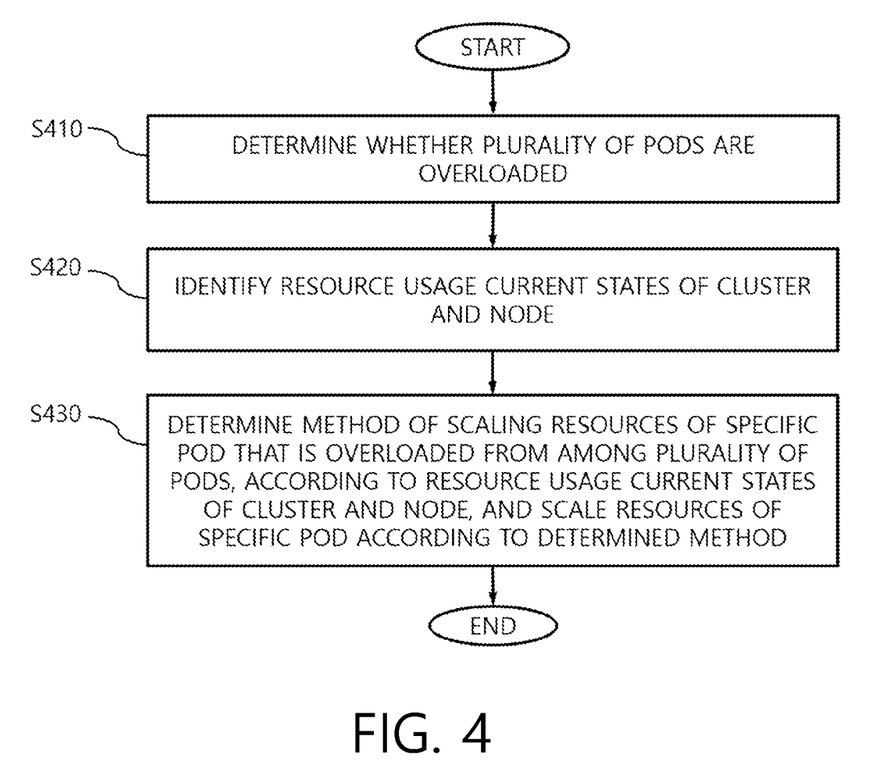
FIG. 4 is a flowchart provided to explain a cloud management method according to an embodiment of the disclosure.

The controller 120 controls overall operations of the cloud management device 100. Specifically, the controller 120 determines whether the plurality of pods are overloaded, identifies resource usage current states of the cluster and the node, determines a method of scaling resources of a specific pod that is overloaded from among the plurality of pods, according to the resource usage current states of the cluster and the node, and scales the resources of the specific pod according to the determined method. Other operations of the controller 120 will be described in detail below with reference to FIG. 4. FIG. 4 is a flowchart provided to explain a cloud management method according to an embodiment.

The controller 120 determines whether the plurality of pods of the cloud platform 10 are overloaded (S410). Specifically, the controller 120 determines whether there is a pod that is overloaded, by using state information of the plurality of pods received from the cloud platform 10.

In addition, the controller 120 identifies resource usage current states of the cluster and the node (S420). Specifically, the controller 120 identifies the resource usage current states of the cluster and the node, based on cluster resource usage current state information and node resource usage current state information which are received from the cloud platform 10.

In addition, the controller 120 determines a method of scaling resources a specific pod that is overloaded from among the plurality of pods, according to the resource usage current states of the cluster and the node, and scales the resources of the specific pod according to the determined method (S430). For example, the controller 120 may determine a pod the CPU usage rate or the memory usage rate of which is 90% or higher from among the plurality of pods as the specific pod overloaded.

The controller 120 may scale the resources of the specific pod in various methods.

The first method is vertical scaling (vertical pod auto-scaler (VPA)). According to the first method, when available resources of a specific node including the specific pod are less than resources allocated to the specific pod, the controller 120 may scale the resources of the specific pod by increasing the resources allocated to the specific pod. Specifically, the controller 120 may increase the resources allocated to the specific pod by increasing the number of CPUs allocated to the specific pod or by increasing a capacity of the memory. In this way, the controller 120 may increase the resources of the pod when available resources of the node are insufficient.

The second method is horizontal scaling (horizontal pod auto-scaler (HPA)). According to the second method, when available resources of the specific node including the specific pod are larger than or equal to resources allocated to the specific pod, the controller 120 may scale the resources of the specific pod by creating a pod replica in the corresponding specific node by replicating the same pod as the specific pod, and by setting the specific pod and the pod replica to perform the same service. Since replicating the pod and letting the pod replica perform the same service are a very simple process, and the specific pod which has already performed the service does not have to be stopped, the controller 120 can stably scale without interruption when scaling in this method.

The third method is hybrid scaling (hybrid pod auto-scaler (hybrid-PA)). According to the third method, when available resources of the specific node including the specific pod is larger than resources allocated to the specific pod, the controller 120 may scale the resources of the specific pod by creating a pod replica by replicating the same pod as the specific pod, by further increasing the resources allocated to the specific pod and resources allocated to the pod replica, and by setting the specific pod and the pod replica to perform the same service. When the specific pod is overloaded and a relevant service requires resources of a high capacity like a high image quality image processing service, the controller 120 replicates the pod and increases the resources of the pod concurrently as described above. By doing so, the controller 120 can establish an environment where an overloaded pod can perform a service more rapidly.

Figure 5:
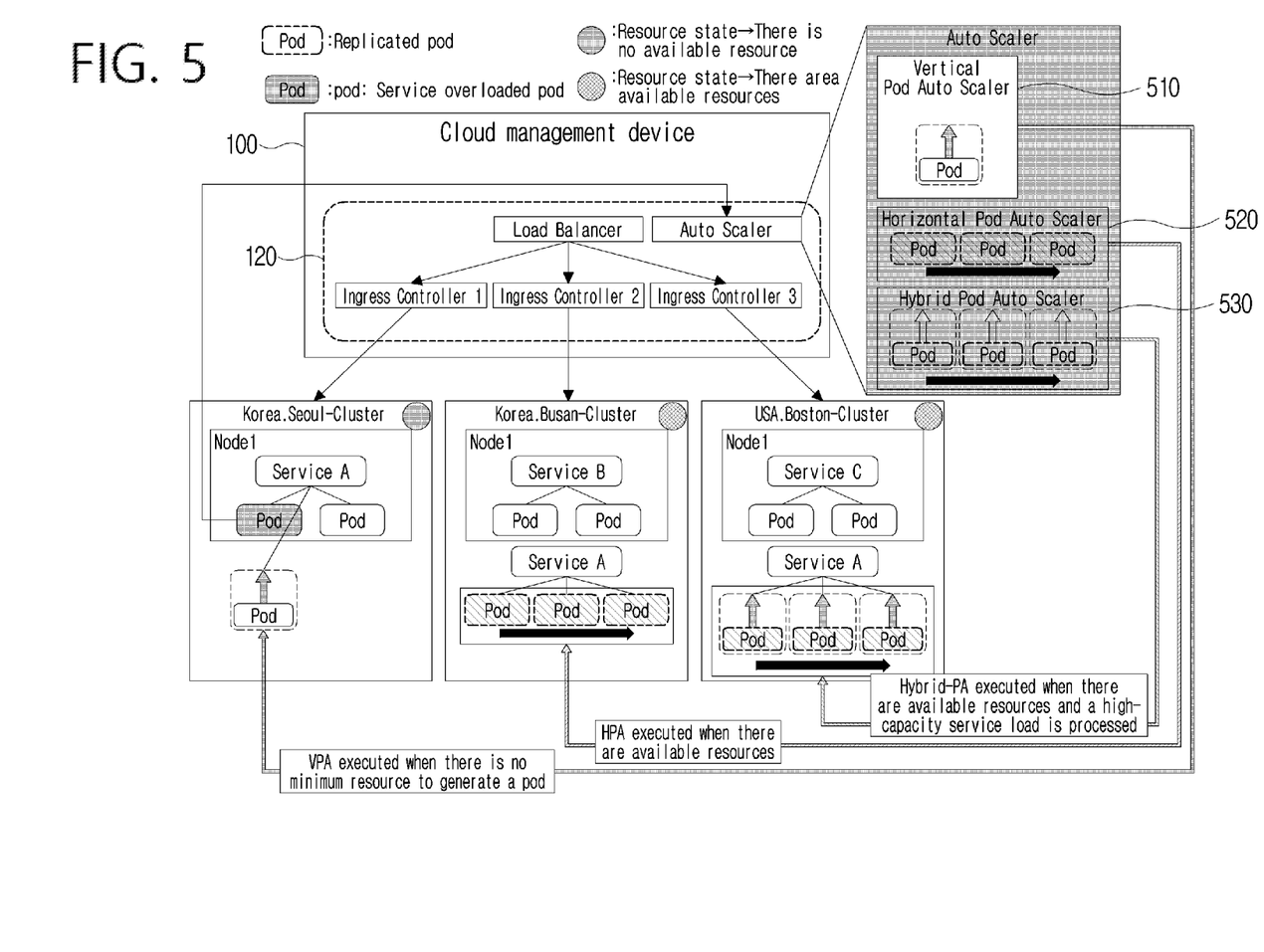
FIG. 5 is a view illustrating a process of scaling cloud resources of a cloud according to an embodiment of the present disclosure.

The controller 120 performs scaling with respect to a pod mainly in the above-described three methods, and the three scaling methods will be descried below with reference to FIG. 5. FIG. 5 is a view illustrating a process of scaling resources of a cloud according to an embodiment.

As shown in FIG. 5, the controller 120 may include a load balancer, an auto scaler, and an ingress controller. In addition, a pod may be scaled by the auto scaler of the controller 120. FIG. 5 illustrates processes of performing vertical scaling (vertical pod auto-scaler (VPA)) 510, horizontal scaling (horizontal pod auto-scaler (HPA)) 520, hybrid scaling (hybrid pod auto-scaler (hybrid-PA)) 530.

As described above, the controller 120 may scale resources of the pod in the three methods.

Hereinafter, other scaling methods will be described.

When available resources of a specific node including a specific pod are larger than or equal to resources allocated to the specific pod, and when there exists a node the available resources of which are larger than or equal to the resources allocated to the specific pod, from among the other nodes in a cluster including the specific pod, the controller 120 may scale the resources of the specific pod by creating a pod replica in the corresponding another node by replicating the same pod as the specific pod, and by setting the specific pod and the pod replica to perform the same service. When available resources of the specific node including the specific pod are larger than or equal to the resources allocated to the specific pod, and when there does not exist a node the available resources of which are larger than or equal to the resources allocated to the specific pod, from among the other nodes in the cluster including the specific pod, the controller 120 may scale the resources of the specific pod by creating a pod replica in the specific node by replicating the same pod as the specific pod, and by setting the specific pod and the pod replica to perform the same service.

As described above, the controller 120 may create the pod replica in another node so far as possible, and may replicate the pod in the same node only when necessary. Accordingly, the controller 120 can manage to prevent the specific node from being overloaded.

In addition, when available resources of the specific node including the specific pod are larger than or equal to resources allocated to the specific pod, and when there exists a node the available resources of which are larger than or equal to the resources allocated to the specific pod, from among nodes in another cluster, the controller 120 may scale the resources of the specific pod by creating a pod replica in the node of the corresponding another cluster by replicating the same pod as the specific pod, and by setting the specific pod and the pod replica to perform the same service.

As described above, the controller 120 may create the pod replica in the node of another cluster so far as possible, and may replicate the pod in the node of the same cluster only when necessary. Accordingly, the controller 120 can manage to prevent a specific cluster from being overloaded, and, by diversifying the cluster in which one service is executed, the controller 120 can manage in a disaster recovery (DR) form, such that the corresponding service can be performed in another cluster without a problem even if one cluster has a fault.

In addition, when available resources of the specific node including the specific pod are less than a threshold value, the controller 120 may scale resources of the specific pod by creating a pod replica in another node in the cluster including the specific pod by replicating the same pod as the specific pod, and by setting the specific pod and the pod replica to perform the same service. That is, when available resources remain in the specific node but the amount of available resources is so small, the controller 120 may not perform vertical scaling (VPA) and may perform horizontal scaling (HPA) of creating a pod replica in another node.

As described above, when available resources of the node to which an overloaded pod belongs is insufficient, the controller 120 may perform scaling to utilize resources of another node for a corresponding service.

In addition, when available resources of all nodes in the cluster including the specific pod are all less than or equal to a specific value, the controller 120 may scale the resources of the specific pod by creating a pod replica in a node in another cluster by replicating the same pod as the specific pod, and by setting the specific pod and the pod replica to perform the same service.

As described above, when available resources of all nodes in the cluster to which an overloaded pod belongs are insufficient, the controller 120 may perform scaling to utilize resources of another cluster for a corresponding service.

As described above, the controller 120 performs scaling with respect to an overloaded pod in various methods.

Through the above-described process, the cloud management device 100 performs a cloud management method for scaling an overloaded pod in various methods.

Figure 6:
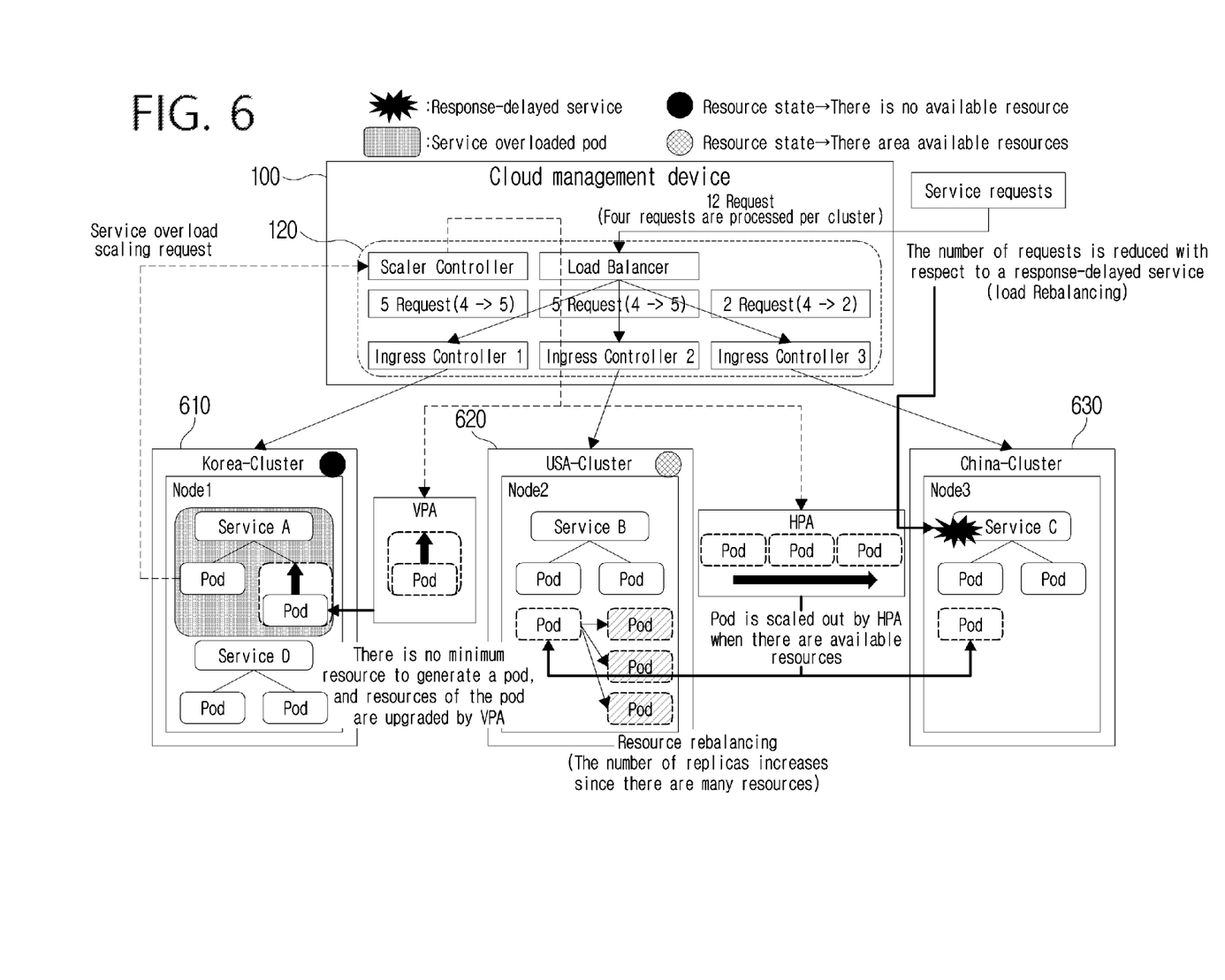
FIG. 6 is a view illustrating a load balancing process of a service request according to an embodiment of the present disclosure.

FIG. 6 is a view illustrating a load balancing process of a service request according to an embodiment. In addition, the process of scaling a pod in various methods is illustrated in FIG. 6.

The cloud management device 100 may perform load balancing with respect to a service request by reducing the number of service requests with respect to a pod which has a slow service respond speed, and by increasing the number of service requests with respect to a pod which has a fast service response speed.

As shown in FIG. 6, when 12 service requests are received, a load balancer of the controller 120 allocates four service requests to each of three clusters 610, 620, 630.

However, in the case of FIG. 6, since the China cluster 630 has a slow service response speed due to a response delay, the load balancer of the controller 120 allocates only two service requests to the China cluster 630. In addition, the load balancer of the controller 120 allocates five service requests to each of the Korea cluster 610 and the USA cluster 620.

Through the above-described process, the cloud management device 100 performs load balancing with respect to the service requests by reducing the number of service requests with respect to the pod that has the slow service response speed, and by increasing the number of requests with respect to the pod which has the fast service response speed.

The technical idea of the present disclosure may be applied to a computer-readable recording medium which records a computer program for performing the function and the method of the apparatus according to the present embodiments. In addition, the technical idea according to various embodiments of the present disclosure may be implemented in the form of a programming language code recorded on the computer-readable recording medium and readable by a computer. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, a flash memory, a solid state disk (SSD), or the like. A code or program that is stored in the computer readable recording medium and readable by a computer may be transmitted via a network connected between computers.

Although the detailed description and drawings describe a configuration of an exemplary device, an implemented thing of an functional operation and a subject explained in the detailed description may be implemented by different types of digital electronic circuits, or may be implemented by computer software, firmware, or hardware including the structure disclosed in the detailed description and a structural equivalent thereto, or may be implemented by a combination of one or more of computer software, firmware, or hardware.

Accordingly, while exemplary embodiments have been particularly shown and described above, it will be understood by those of ordinary skill in the art that various changes in form and details may be made therein without departing from the spirit and scope.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A cloud management method by a cloud management device in a cloud platform environment, the method comprising:

determining whether a plurality of pods are overloaded;
   identifying resource usage current states of a cluster and a node; and
   determining a method of scaling resources of a specific pod that is overloaded from among the plurality of pods, according to the resource usage current states of the cluster and the node, and scaling the resources of the specific pod according to the determined method,
   wherein the scaling comprises, when available resources of a specific node including the specific pod are less than resources allocated to the specific pod, scaling the resources of the specific pod by increasing the resources allocated to the specific pod, and
   wherein the scaling further comprises, when the available resources of the specific node including the specific pod are larger than or equal to the resources allocated to the specific pod, scaling the resources of the specific pod by creating a pod replica in the corresponding specific node by replicating the same pod as the specific pod, and by setting the specific pod and the pod replica to perform a same service.

2. The method of claim 1, wherein the scaling further comprises, when the available resources of the specific node including the specific pod are larger than the resources allocated to the specific pod, scaling the resources of the specific pod by creating the pod replica by replicating the same pod as the specific pod, by further increasing the resources allocated to the specific pod and resources allocated to the pod replica, respectively, and by setting the specific pod and the pod replica to perform the same service.

3. The method of claim 1, wherein the scaling further comprises, when the available resources of the specific node including the specific pod are larger than or equal to the resources allocated to the specific pod, and when there exists a node available resources of which are larger than or equal to the resources allocated to the specific pod, from among other nodes in a cluster including the specific pod, scaling the resources of the specific pod by creating a pod replica in the corresponding another node by replicating the same pod as the specific pod, and by setting the specific pod and the pod replica to perform the same service.

4. The method of claim 1, wherein the scaling further comprises, when the available resources of the specific node including the specific pod are larger than or equal to the resources allocated to the specific pod, and when there does not exist a node available resources of which are larger than or equal to the resources allocated to the specific pod, from among other nodes in a cluster including the specific pod, scaling the resources of the specific pod by creating the pod replica in the specific node by replicating the same pod as the specific pod, and by setting the specific pod and the pod replica to perform the same service.

5. The method of claim 1, wherein the scaling further comprises, when the available resources of the specific node including the specific pod are larger than or equal to the resources allocated to the specific pod, and when there exists a node available resources of which are larger than or equal to the resources allocated to the specific pod, from among nodes in another cluster, scaling the resources of the specific pod by creating a pod replica in the node of the corresponding another cluster by replicating the same pod as the specific pod, and by setting the specific pod and the pod replica to perform the same service.

6. The method of claim 1, wherein the scaling further comprises, when available resources of a specific node including the specific pod are less than or equal to a threshold value, scaling the resources of the specific pod by creating a pod replica in another node in a cluster including the specific pod by replicating the same pod as the specific pod, and by setting the specific pod and the pod replica to perform a same service.

7. The method of claim 6, wherein the scaling further comprises, when all available resources of all nodes in the cluster including the specific pod are less than or equal to a specific value, scaling the resources of the specific pod by creating a pod replica in a node of another cluster by replicating the same pod as the specific pod, and by setting the specific pod and the pod replica to perform a same service.

8. A cloud management device comprising:

a communication processor configured to receive state information of a plurality of pods and resource usage current state information of a cluster and a node; and
   a processor configured to determine whether the plurality of pods are overloaded, to identify resource usage current states of the cluster and the node, and to determine a method of scaling resources of a specific pod that is overloaded from among the plurality of pods, according to the resource usage current states of the cluster and the node, and to scale the resources of the specific pod according to the determined method,
   wherein, for the scaling, the processor is further configured to, when available resources of a specific node including the specific pod are less than resources allocated to the specific pod, scale the resources of the specific pod by increasing the resources allocated to the specific pod, and
   wherein, for the scaling, the processor is further configured to, when the available resources of the specific node including the specific pod are larger than or equal to the resources allocated to the specific pod, scale the resources of the specific pod by creating a pod replica in the corresponding specific node by replicating the same pod as the specific pod, and by setting the specific pod and the pod replica to perform a same service.

9. The cloud management device of claim 8, wherein the processor is further configured to, when the available resources of the specific node including the specific pod are larger than the resources allocated to the specific pod, scaling the resources of the specific pod by creating the pod replica by replicating the same pod as the specific pod, by further increasing the resources allocated to the specific pod and resources allocated to the pod replica, respectively, and by setting the specific pod and the pod replica to perform the same service.

10. The cloud management device of claim 8, wherein the processor is further configured to, when the available resources of the specific node including the specific pod are larger than or equal to the resources allocated to the specific pod, and when there exists a node available resources of which are larger than or equal to the resources allocated to the specific pod, from among other nodes in a cluster including the specific pod, scaling the resources of the specific pod by creating a pod replica in the corresponding another node by replicating the same pod as the specific pod, and by setting the specific pod and the pod replica to perform the same service.

11. The cloud management device of claim 8, wherein the processor is further configured to, when the available resources of the specific node including the specific pod are larger than or equal to the resources allocated to the specific pod, and when there does not exist a node available resources of which are larger than or equal to the resources allocated to the specific pod, from among other nodes in a cluster including the specific pod, scaling the resources of the specific pod by creating the pod replica in the specific node by replicating the same pod as the specific pod, and by setting the specific pod and the pod replica to perform the same service.

12. The cloud management device of claim 8, wherein the processor is further configured to, when the available resources of the specific node including the specific pod are larger than or equal to the resources allocated to the specific pod, and when there exists a node available resources of which are larger than or equal to the resources allocated to the specific pod, from among nodes in another cluster, scaling the resources of the specific pod by creating a pod replica in the node of the corresponding another cluster by replicating the same pod as the specific pod, and by setting the specific pod and the pod replica to perform the same service.

13. The cloud management device of claim 8, wherein the processor is further configured to, when available resources of a specific node including the specific pod are less than or equal to a threshold value, scaling the resources of the specific pod by creating a pod replica in another node in a cluster including the specific pod by replicating the same pod as the specific pod, and by setting the specific pod and the pod replica to perform a same service.

14. The cloud management device of claim 13, wherein the processor is further configured to, when all available resources of all nodes in the cluster including the specific pod are less than or equal to a specific value, scaling the resources of the specific pod by creating a pod replica in a node of another cluster by replicating the same pod as the specific pod, and by setting the specific pod and the pod replica to perform a same service.

15. A cloud system comprising:
a cloud platform comprising a plurality of clusters, a plurality of nodes, and a plurality of pods; and
a processor of a cloud management apparatus configured to determine whether the plurality of pods are overloaded, to identify resource usage current states of the cluster and the node, and to determine a method of scaling resources of a specific pod that is overloaded from among the plurality of pods, according to the resource usage current states of the cluster and the node, and to scale the resources of the specific pod according to the determined method,
wherein, for the scaling, the processor is further configured to, when available resources of a specific node including the specific pod are less than resources allocated to the specific pod, scale the resources of the specific pod by increasing the resources allocated to the specific pod, and
wherein, for the scaling, the processor is further configured to, when the available resources of the specific node including the specific pod are larger than or equal to the resources allocated to the specific pod, scale the resources of the specific pod by creating a pod replica in the corresponding specific node by replicating the same pod as the specific pod, and by setting the specific pod and the pod replica to perform a same service.

16. The cloud system of claim 15, wherein the processor is further configured to, when the available resources of the specific node including the specific pod are larger than the resources allocated to the specific pod, scaling the resources of the specific pod by creating the pod replica by replicating the same pod as the specific pod, by further increasing the resources allocated to the specific pod and resources allocated to the pod replica, respectively, and by setting the specific pod and the pod replica to perform the same service.

17. The cloud system of claim 15, wherein the processor is further configured to, when the available resources of the specific node including the specific pod are larger than or equal to the resources allocated to the specific pod, and when there exists a node available resources of which are larger than or equal to the resources allocated to the specific pod, from among other nodes in a cluster including the specific pod, scaling the resources of the specific pod by creating a pod replica in the corresponding another node by replicating the same pod as the specific pod, and by setting the specific pod and the pod replica to perform the same service.

18. The cloud system of claim 15, wherein the processor is further configured to, when the available resources of the specific node including the specific pod are larger than or equal to the resources allocated to the specific pod, and when there does not exist a node available resources of which are larger than or equal to the resources allocated to the specific pod, from among other nodes in a cluster including the specific pod, scaling the resources of the specific pod by creating the pod replica in the specific node by replicating the same pod as the specific pod, and by setting the specific pod and the pod replica to perform the same service.

19. The cloud system of claim 15, wherein the processor is further configured to, when the available resources of the specific node including the specific pod are larger than or equal to the resources allocated to the specific pod, and when there exists a node available resources of which are larger than or equal to the resources allocated to the specific pod, from among nodes in another cluster, scaling the resources of the specific pod by creating a pod replica in the node of the corresponding another cluster by replicating the same pod as the specific pod, and by setting the specific pod and the pod replica to perform the same service.

20. The cloud system of claim 15, wherein the processor is further configured to, when available resources of a specific node including the specific pod are less than or equal to a threshold value, scaling the resources of the specific pod by creating a pod replica in another node in a cluster including the specific pod by replicating the same pod as the specific pod, and by setting the specific pod and the pod replica to perform a same service.

* * * * *